(12) United States Patent
Bent et al.

(10) Patent No.: US 11,080,196 B2
(45) Date of Patent: Aug. 3, 2021

(54) PATTERN-AWARE PREFETCHING USING PARALLEL LOG-STRUCTURED FILE SYSTEM

(71) Applicants: EMC IP Holding Company LLC, Hopkinton, MA (US); Triad National Security, LLC, Los Alamos, NM (US)

(72) Inventors: John M. Bent, Los Alamos, NM (US); Sorin Faibish, Newton, MA (US); Gary Grider, Los Alamos, NM (US); Aaron Torres, Los Alamos, NM (US); Jun He, Madison, WI (US)

(73) Assignees: EMC IP Holding Company LLC, Hopkinton, MA (US); Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 16/716,972

(22) Filed: Dec. 17, 2019

(65) Prior Publication Data
US 2020/0125493 A1 Apr. 23, 2020

Related U.S. Application Data

(63) Continuation of application No. 14/041,457, filed on Sep. 30, 2013, now abandoned.

(51) Int. Cl.
*G06F 12/0862* (2016.01)
(52) U.S. Cl.
CPC .................. *G06F 12/0862* (2013.01)
(58) Field of Classification Search
CPC ............ G06F 16/1805; G06F 12/0862
See application file for complete search history.

(56) References Cited

U.S. PATENT DOCUMENTS

| 5,369,605 A | 11/1994 | Parks |
| 2007/0106849 A1 | 5/2007 | Moore et al. |

OTHER PUBLICATIONS

Bent et al., "Storage of Sparse File Using Parallel Log-Structured File System", U.S. Appl. No. 13/921,719, filed Jun. 19, 2013.
"Filesystem in Userspace (FUSE)", http://fuse.sourceforge.net.
"Filesystem in Userspace" http://en.wikipedia.org/wiki/Filesystem_in_Userspace.
Bent et al., "PLFS: A Checkpoint Filesystem for Parallel Applications," Int'l Conf. for High Performance Computing, Networking, Storage and Analysis 2009 (SC09) (Nov. 2009).
Manzanares, et al., "The Power and Challenges of Transformative I/O," in IEEE Cluster 2012, Beijing, China (Sep. 2012).

(Continued)

*Primary Examiner* — Tracy A Warren
(74) *Attorney, Agent, or Firm* — Ryan, Mason & Lewis, LLP (57) ABSTRACT

Techniques are provided for pattern-aware prefetching using a parallel log-structured file system. At least a portion of one or more files is accessed by detecting at least one pattern in a non-sequential access of the one or more files; and obtaining at least a portion of the one or more files based on the detected at least one pattern. The obtaining step comprises, for example, a prefetching or pre-allocation of the at least the portion of the one or more files. A prefetch cache can store the portion of the one or more obtained files. The cached portion of the one or more files can be provided from the prefetch cache to an application requesting the at least a portion of the one or more files.

20 Claims, 10 Drawing Sheets

(56) References Cited

OTHER PUBLICATIONS

He et al., "Pattern Structured PLFS (Pattern PLFS)", https://github.com/junhe/plfs/tree/complexindex.
Ziv et al., "A Universal Algorithm for Sequential Data Compression," IEEE Trans. on Information Theory, 23(3):337-343 (1977).
Knuth et al., "Fast Pattern Matching in Strings," SIAM Journal on Computing, 6(2):323-350 (1977).
Buck et al., "SIDR: Efficient Structure-Aware Intelligent Data Routing in SciHaDoop," Technical Report, UCSC.
"GitHub", https://github.com/junhe/plfs/tree/complexindex, downloaded on Feb. 17, 2016.
He et al., "I/OAcceleration with Pattern Detection", HPDC, Jun. 17-21, 2013.
Nakamura et al., "Pre-Allocation Size Adjusting Methods Depending on Growing File Size," Storage Network Architecture and Parallel I/Os (SNAP), Sep. 22, 2008.
He et al., "Pattern-Aware File Reorganization in MPI-IO," 6th Parallel Data Storage Workshop (PDW '11), in conjunction with ACM/IEEE Supercomputing 2011, Nov. 2011.
He et al., "KNOWAC: I/O Prefetch via Accumulated Knowledge," 2012 IEEE International Conference on Cluster Computing (CLUSTER), 2012 IEEEm Sep. 24-28, 2012.
Bell et al., "Longest-match String Searching for Ziv-Lempel Compression," Software-Practice and Experience, vol. 23 (7), 757-777, 1993.
Oxford English Dictionary (OED) Online, Jan. 2018. Oxford University Press. http://www.oed.com/view/Entry/40227?redirectedFrom=contiguous (accessed Feb. 6, 2018) (year: 2018).

```
ID: CHUNK ID USED TO LOCATE THE CORRESPONDING DATA DROPPING FILE
LOGICAL: LOGICAL OFFSET PATTERN UNIT
LENGTH[]: AN ARRAY OF PATTERN UNITS REPRESENTING LENGTHS
PHYSICAL[]: AN ARRAY OF PATTERN UNITS REPRESENTING PHYSICAL OFFSETS
```

FIG. 6

Algorithm 1: Pattern Detection

```
Data: A sequence of numbers: q
Result: Pattern of q
/* delta is the distance between
   consecutive numbers in q                              */
for i=0;i<q.length-1;i++ do
 |  delta[i] = q[i + 1] - q[i]
end
/* container of pattern units                            */
initialize pattern stack ps;

initialize lookahead window lw on delta[0];
initialize search window sw in front of delta[];
while lw is NOT empty do
 |  if ∀k, lw[1:k]==sw[sw.size-k+1:sw.size]
 |  AND lw[1:k] can be merged with the last elements in ps
 |  then
 |   |  /* merge lw[1:k] to ps.top ()                    */
 |   |  update ps.top();
 |   |
 |   |  lw.moveforwardby(k);
 |   |  sw.moveforwardby(k);
 |  else
 |   |  initialize pattern unit p;
 |   |  p.d = lw.first();
 |   |  ps.push(p);
 |   |  lw.moveforwardby(1);
 |   |  sw.moveforwardby(1);
 |  end
end
foreach p in ps do
 |  p.init = p.d[0]'s corresponding number in q
end
```

| Algorithm 2: Lookup offset in an pattern index entry. |
|---|

Data: Requested offset: *off*, a pattern entry (Figure 6): *e*
Result: if *off* is inside *e*, return the corresponding physical
        offset and length of a contiguous piece of data
if *off* < *e.logical.init* OR *off* > *e.logical.last* then
 | return *false*;                        /* out of range  */
end
*roff* = *off* − *e.logical.init* ;       /* relative offset */
/* stride of the pattern                                  */
*stride* = *sum*(*e.logical.d*[]) ;
/* remainder                                              */
*rem* = *roff* % *stride*
/* num of strides the offset passed                       */
*row* = *roff*/*stride*;
/* Find the delta that roff fails in                      */
*sum* = 0;
for *col_pos* = 0; *sum* <= *rem* ;*col_pos*++ do
 | *sum*+ = *e.logical.d*[*col_pos*];
end
*col_pos* = *col_pos* − 1;
*pos* = *col_pos* + *row* * *e.logical.d.size*();
*o_offset* = *e.logical*[*pos*];          /* posth offset */
*o_length* = *e.length*[*pos*];           /* posth length */
if *off* falls in (*o_offset*, *o_length*) then
 |  *shift* = *off* − *o_offset*;
 |  *o_length* = *o_length* − *shift*;
 |  *o_physical* = *e.physical*[*pos*] + *shift*;
 |  *o_chunk_id* = *e.chunkid*;
 |  return (*o_length*, *o_physical*, *o_chunk_id*);
else
 | return *false*;
end

ID[]: AN ARRAY OF CHUNK ID INDICATING THE POSITIONS OF PROCESSES INSIDE THE GLOBAL PATTERN
LOGICAL: A LOGICAL OFFSET PATTERN UNIT
LENGTH: A LENGTH PATTERN UNIT
PHYSICAL: A PHYSICAL OFFSET PATTERN UNIT

ID[]: [4,7,6,2,8,9,4,7,6,2,8,9]
LOGICAL: 1000,(30)~4
LENGTH: 10,(0)~4
PHYSICAL: 0,(10)~4

Algorithm 3: Lookup offset in an global index pattern entry.

Data: Requested offset: $off$, a global pattern entry (Figure 11): $g$
Result: If $off$ is inside $g$, return the corresponding physical offset and length of the contiguous piece of data /* check if off falls in the range of the global pattern                                               */
if $off < g.logical.init$ OR $off > g.logical.last$ then
  | return $false$
end
$r = off - g.logical.i$ ;                    /* relative offset */
$s = g.logical.d[0]$ ;                        /* stride         */
/* global stride, $r$ is the number of repetitions in the pattern unit                                  */
$gs.size = s * g.logical.r$;
/* which global stride $r$ falls in                              */
$gs.id = r/gs.size$ $gs.rem = r \bmod gs.size$;
/* row inside a global stride                                    */
$row = gs.rem/s$;
/* column inside a stride                                        */
$col = (gs.rem \% s)/g.length.i$ ;
if $g.logical[gs.id][row][col]$ is $out\ of\ the\ range\ of\ g$ then
  | return $false$;
end
$p = (s/g.length.i) * gs.id + col - 1$;
$chunkid = g.id[p]$ ;          /* $p$th local pattern id */
$shift = off - g.logical[gs.id][row][col]$;
/* Num of chunkid in the 1~p id's                                */
$cnt = g.id[1:p].count(chunkid)$ $o\_physical\_offset = g.physical.i + g.physical.d[0]$
    $*g.physical.r * cnt + g.physical.d[0] * row$;
return $gs[gs.id][row][col].length - shift$,
    $o\_physical\_offset + shift, chunkid$;

PATTERN-AWARE PREFETCHING USING PARALLEL LOG-STRUCTURED FILE SYSTEM

CROSS-REFERENCE TO RELATED APPLICATIONS

This application is a continuation of U.S. patent application Ser. No. 14/041,457, filed Sep. 30, 2013, incorporated by reference herein.

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

FIELD

The present invention relates to the prefetching of files.

BACKGROUND

High Performance Computing (HPC) techniques are used in many industries and applications for implementing computationally intensive models or simulations. The ability to scale processing in such HPC environments, however, greatly exceeds the ability to scale storage of Input/Output (I/O) operations and it is increasingly important to extract all available performance from the storage hardware. Distributed data structures typically resolve into simple offset and length pairs in the storage system, regardless of the initial information that was available.

Prefetching reduces I/O latency by predicting future data that will be used by an application and making the predicted data available in memory before the data is requested by the application. When a file is requested from disk, regions of the file may be accessed sequentially. In this case, the file system might guess that subsequent sequential regions might be accessed next. When the file system detects a sequential file access, the file system might proactively read subsequent sequential regions into a cache so that if an application requests a predicted region, the latency to return the requested region from the cache to the application is reduced. When the access is not sequential, however, prefetching is more difficult.

A need therefore exists for prefetching techniques that identify patterns in non-sequential I/O operations and prefetch data using the identified patterns.

SUMMARY

Embodiments of the present invention provide improved techniques for pattern-aware prefetching using a parallel log-structured file system. In one embodiment, at least a portion of one or more files is accessed by detecting at least one pattern in a non-sequential access of the one or more files; and obtaining at least a portion of the one or more files based on the detected at least one pattern. The obtaining step comprises, for example, a prefetching or pre-allocation of the at least a portion of the one or more files.

According to a further aspect of the invention, a prefetch cache can be employed to store the portion of the one or more obtained files. The cached portion of the one or more files can be provided from the prefetch cache to an application requesting the at least a portion of the one or more files. For example, a prefetch manager can receive the detected at least one pattern from a pattern detector, predict future requests based on the detected at least one pattern and request a prefetch thread to fetch the at least a portion of the one or more files from a file system for storage in the prefetch cache.

Advantageously, illustrative embodiments of the invention provide pattern-aware prefetching using a parallel log-structured file system. Prefetching in accordance with aspects of the present invention provides metadata reduction and reduced I/O latency. These and other features and advantages of the present invention will become more readily apparent from the accompanying drawings and the following detailed description.

DETAILED DESCRIPTION

The present invention provides improved techniques for prefetching files using a parallel log-structured file system. Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

According to aspects of the present invention, metadata reduction is achieved by rediscovering valuable information, such as patterns, that was lost as data moved across an interface. Write operations are storing a structured data set, thus they will typically follow a regular pattern. As discussed hereinafter, by discovering this pattern, a PLFS index entry (metadata) per write can be can replaced with a single pattern entry describing all the write operations thereby converting the size of the index from O(n) to a small constant value. Another aspect of the invention provides techniques for pattern aware file prefetching for non-sequential read accesses.

Figure 1:
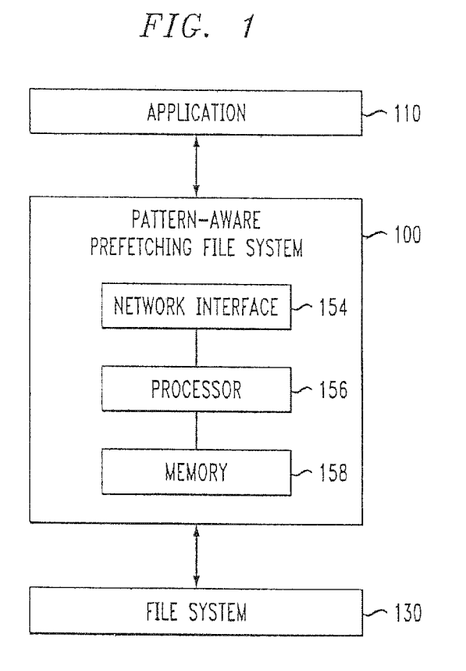
FIG. 1 is a block diagram of an exemplary pattern-aware prefetching file system incorporating aspects of the present invention.

FIG. 1 is a block diagram of an exemplary pattern-aware prefetching file system 100 incorporating aspects of the present invention. As discussed further below, the exemplary pattern-aware prefetching file system 100 intercepts, inspects and forwards I/O requests to an underlying file system 130. The exemplary pattern-aware prefetching file system 100 allows prefetching for non-sequential, but regular, I/O patterns. The requests are observed, patterns are detected, and any detected patterns are used to prefetch data for predicted future reads.

As shown in FIG. 1 and as discussed further below in conjunction with FIG. 14, the exemplary pattern-aware prefetching file system 100 provides a layer between applications 110 and an underlying file system 130. For write workloads, the exemplary pattern-aware prefetching file system 100 forwards all writes to the underlying file system 130. For read workloads, however, the exemplary pattern-aware prefetching file system 100 will attempt pattern-aware prefetching. In this manner, reads that were correctly predicted and prefetched will be satisfied from the cache of the exemplary pattern-aware prefetching file system 100 but reads that were not predicted will necessarily be forwarded to the underlying file system 130.

Traditional file systems typically store data on disks and then retrieve the stored data from the disks. Virtual file systems, however, do not actually store data. Rather, virtual file systems act as a view or translation of an existing file system or storage device. FUSE (Filesystem in Userspace) is particularly useful for writing virtual file systems. FUSE is an existing file system abstraction with a well-defined interface. In principle, any resource that is available to a FUSE implementation can be exported as a file system. PLFS and many other file systems have FUSE implementations. For a more detailed discussion of a FUSE file system, see, for example, Filesystem in Userspace (FUSE), available from SourceForge, an Open Source community; and Filesystem in Userspace, available from the "Filesystem_in_Userspace" page on Wikipedia, each incorporated by reference herein.

In one exemplary embodiment, the exemplary pattern-aware prefetching file system 100 is implemented using PLFS, as modified herein to provide the features and functions of the present invention. See, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

The exemplary pattern-aware prefetching file system 100 further comprises a processor 156 coupled to a memory 158. The processor 156 may comprise a microprocessor, a microcontroller, an application-specific integrated circuit (ASIC), a field-programmable gate array (FPGA) or other type of processing circuitry, as well as portions or combinations of such circuitry elements. The memory 158 may comprise random access memory (RAM), read-only memory (ROM) or other types of memory, in any combination. The memory 158 and other memories disclosed herein may be viewed as examples of what are more generally referred to as "computer program products" storing executable computer program code.

One or more elements of the exemplary pattern-aware prefetching file system 100 may be implemented at least in part in the form of software that is stored in memory 158 and executed by processor 156. The exemplary pattern-aware prefetching file system 100 comprising processor, memory and network interface components as described above is an example of what is more generally referred to herein as a "processing device." Also included in the exemplary pattern-aware prefetching file system 100 is network interface circuitry 154. The network interface circuitry 154 allows the exemplary pattern-aware prefetching file system 100 to communicate over a network with one or more additional processing devices. The network interface circuitry 154 may comprise, for example, one or more conventional transceivers.

Pattern Structured PLFS

PLFS is a virtual parallel file system, providing a powerful transformative I/O middleware layer. By transparently reorganizing shared-file writing into a separate log-structured file for each process, PLFS improves the performance of many important high performance computing applications by several orders of magnitude. In PLFS, the file that the user writes (and later reads) is referred to as the logical file and the set of files that PLFS creates to store the data within the logical file is referred to as as physical files. The user accesses logical files through PLFS and PLFS in turn accesses its physical files from a set of backend file systems such as Lustre, GPFS, PanFS, or Ceph.

PLFS Index

As each process writes to the shared logical file, PLFS appends that data to a unique physical logfile (data dropping) for that process and creates an index entry in a unique physical index file (index dropping) which maintains a mapping between the bytes within the logical file and their physical location within the data droppings. When a read request (e.g., read(fd, off, len)) is performed, PLFS queries the index to find where that actual data resides within the data dropping files. The key variables of a current index entry are:

logical offset: where the data is, from the application's perspective in a single logical file;
  length: number of bytes written;
  physical offset: this is the physical offset within a contiguous data dropping file;
  chunk id: the ID of the dropping file where the data resides.

As applications grow in size, the number of the physical index files, and the number of index entries within them, grows correspondingly. This growth introduces overhead in several different ways. The performance overhead of the index creation is slight, but noticeable, during writes. Performance overhead for reading, however, is much larger. A reader might read from any portion of the file, thus every index file and every index entry must be read. Also, the sheer quantity of the index entries results in a large footprint in both memory and on disk. The latency of reading the complete index entries from disk and building the in-memory index structure has previously been addressed in A. Manzanares, et al., "The Power and Challenges of Transformative I/O," in IEEE Cluster 2012, Beijing, China (September 2012), by exploiting parallelism within the MPI library. Aspects of the present invention extend the earlier work by further reducing the latency as well as the other overheads by using efficient pattern detection and compact pattern descriptions to reduce the amount of PLFS index information, resulting in a compression factor of several orders of magnitude for exemplary applications.

Architecture

Jun He at el., Pattern Structured PLFS (Pattern PLFS), available from the junhe/PLFS page of the github web-based Git repository hosting service, discovers pattern structures in indices (which can be considered as I/O traces) and represents the mapping in a compact way, so that reading takes less time and uses less space for processing indices.

Figure 2:
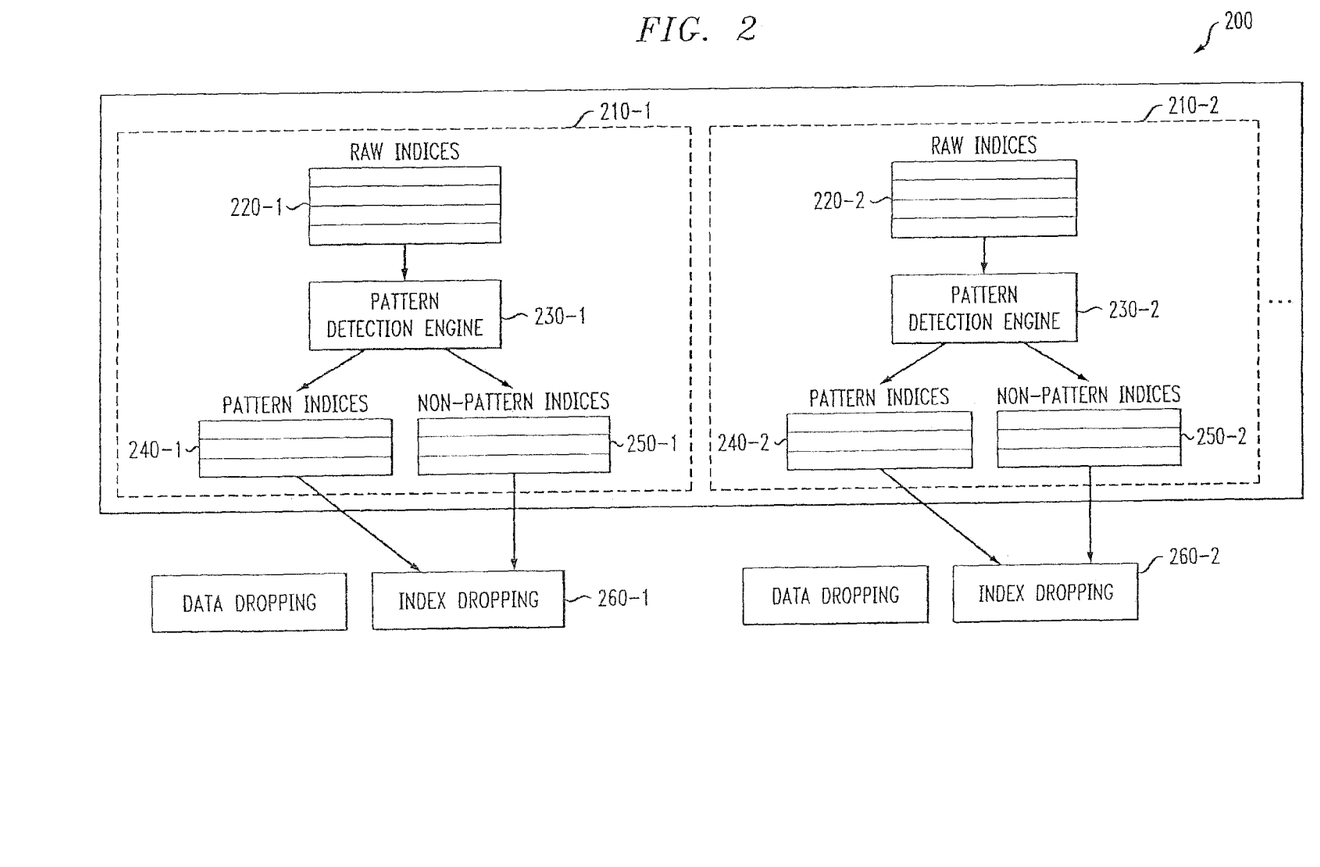
FIG. 2 illustrates an exemplary pattern Parallel Log Structured File System (PLFS) index framework.

FIG. 2 illustrates an exemplary pattern PLFS index framework 200. As shown in FIG. 2, when writing, Pattern PLFS buffers traditional indices 210-$i$ in raw index buffers 220-$i$ for each of two exemplary processes i=1 and 2. After the buffer 220 is full or at the time of closing, a pattern discovering engine 230-$i$ starts processing the raw indices and puts the generated pattern structure entries to a pattern index buffer 240-$i$ and non-pattern entries to a non-pattern index buffer 250-$i$. At the end, the entries will be written to pattern index files 260-$i$.

Figure 3:
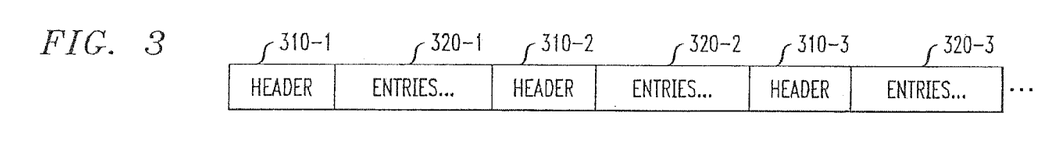
FIG. 3 illustrates an exemplary pattern PLFS index file format.
Figure 4:
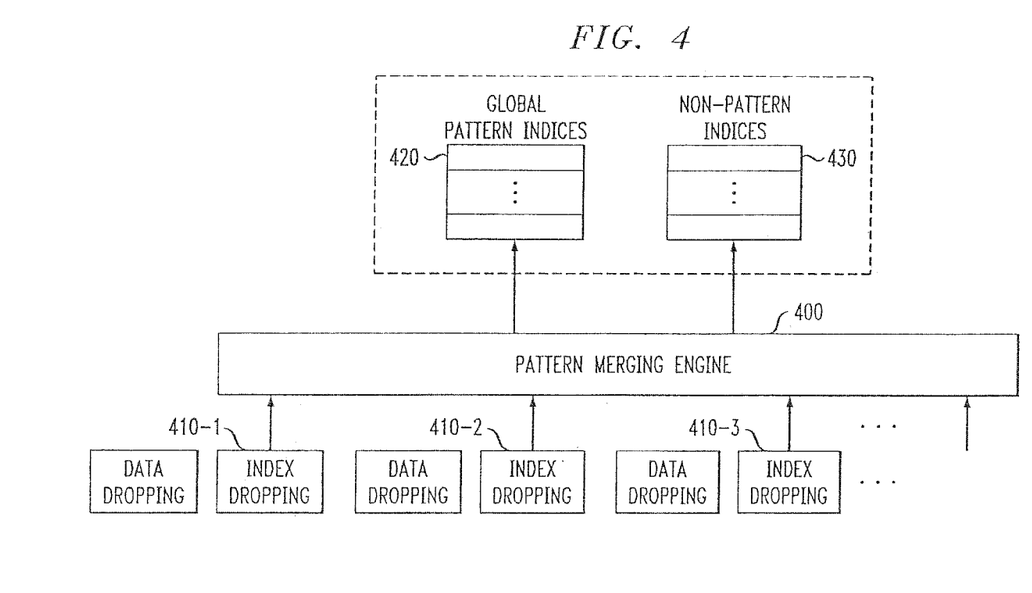
FIG. 4 illustrates an exemplary pattern merging engine for reading and merging indices to form global indices in buffers.

FIG. 3 illustrates an exemplary pattern PLFS index file format 300. In the exemplary implementation, each header 310 of the exemplary pattern PLFS index file format 300 indicate the type and size (e.g., length) of the corresponding entry 320 following the header 310. FIG. 4 illustrates an exemplary pattern merging engine 400 for reading and merging indices 410 (corresponding to the pattern index files 260-$i$ of FIG. 2) to form global indices in buffers 420, 430. Generally, when an application reads a file, Pattern PLFS reads indices 410 from files, merges pattern entries into global ones whenever possible using the exemplary pattern merging engine 400, and stores the global pattern entries and non-pattern entries in separate buffers 420, 430. The contents of the buffers 420, 430 are optionally broadcast to other processes that are reading the PLFS file.

Local Pattern Structure

A local pattern structure describes the access behaviors of a single process. For example, a process may write to a file with an (offset, length) pair sequence such as: (0, 4), (5, 4), (10, 4), (15, 4). This is an example of a typical fixed-stride pattern and can be described in some form (e.g., saying start offset is 0; stride is 5; length is 4) of smaller size by checking if the stride is constant. Strided patterns occur when accessing parts of regular data structure (e.g., odd columns of a two-dimensional matrix). A more complex pattern would occur when accessing discrete parts of an array consisting of complex data types (e.g., MPI file view with complex data types or high-dimension data with complex types). To compress complex patterns, an algorithm is needed to identify the repeating sequences and a structure to represent them in a compact way. The structure should also allow fast random accesses without decoding.

Figure 5:
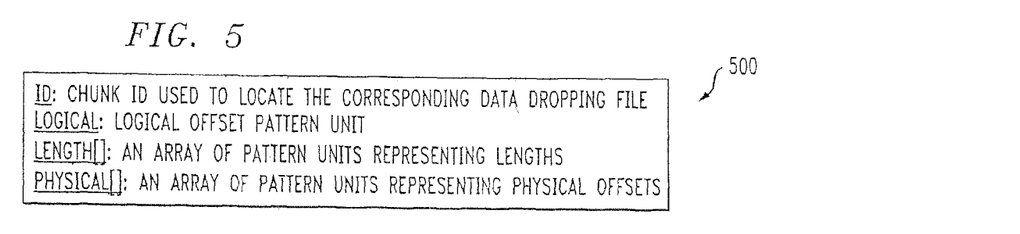
FIG. 5 illustrates an exemplary structure of a pattern index entry.

FIG. 5 illustrates an exemplary structure of a pattern index entry 500. As shown in FIG. 5, the exemplary pattern index entry 500 comprises a chunk identifier (id) used to locate the data dropping file corresponding to the pattern; a logical field indicating a logical offset pattern unit, discussed below; a length[ ] array of pattern units representing lengths; and a physical[ ] array of pattern units representing physical offsets. One logical offset pattern may map to many length and physical offset patterns. In an exemplary notation, a logical offset pattern unit can be expressed as [i,(d[0], d[1], . . . )^r], where i is the first element of the original sequence; d[ ] (delta) is a repeating part of an array containing the distances of any two consecutive elements in the original sequence; and r is a number of repetitions. For example, (5,7,10,12,15) can be represented as [5,(2,3)^2].

Figure 6:
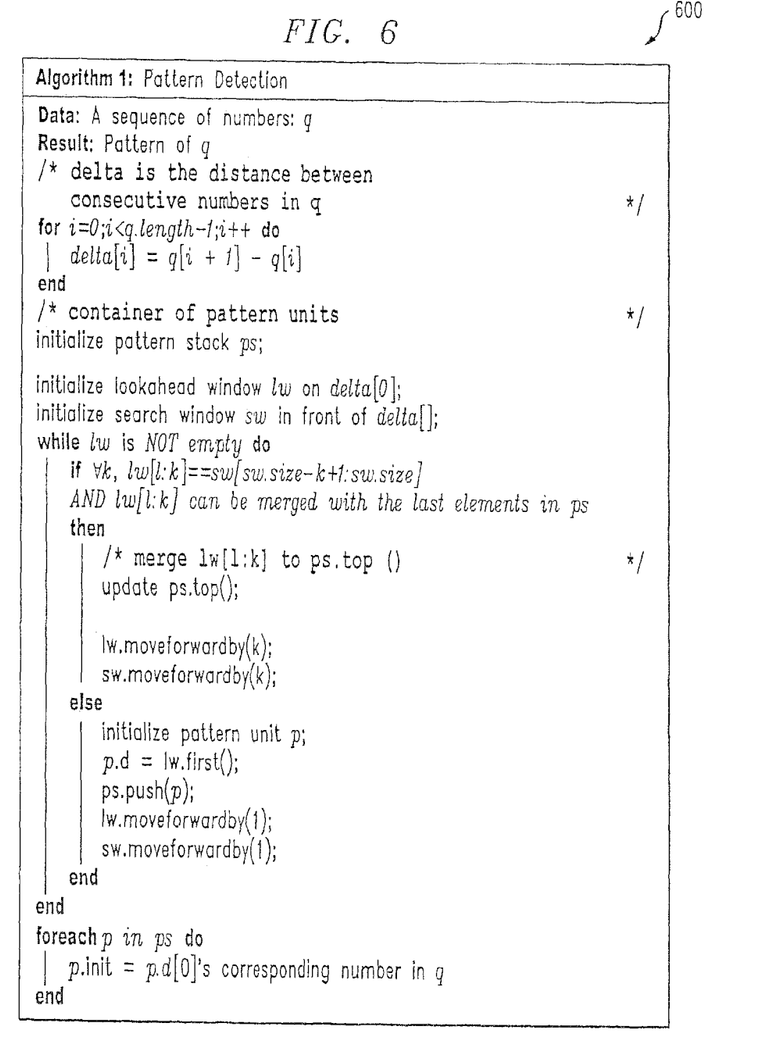
FIG. 6 illustrates pseudo code for an exemplary pattern detection process incorporating aspects of the present invention.

FIG. 6 illustrates pseudo code 600 for an exemplary pattern detection process incorporating aspects of the present invention. As discussed more fully below, the exemplary pattern detection process discovers common patterns in data accesses and stores them in a data structure that allows PLFS to conduct lookups without decompressing the index. The exemplary implementation of the pattern detection process is based on the sliding window algorithm described in J. Ziv and A. Lempel, "A Universal Algorithm for Sequential Data Compression," IEEE Trans. On Information Theory, 23(3): 337-343 (1977).

As shown in FIG. 6, the exemplary implementation of the pattern detection process comprises three significant steps. The first step is to retrieve the distances (delta[ ]) of consecutive numbers. The second step is to move two sliding windows along the delta[ ] to find any consecutive repeating subsequences, and place them on a stack (p). The third step is to put the original starting numbers of each repeating subsequence back on the pattern stack in order to form the final patterns. By using the original starting number and the deltas, any number in the original sequence can be recovered.

Figure 7:
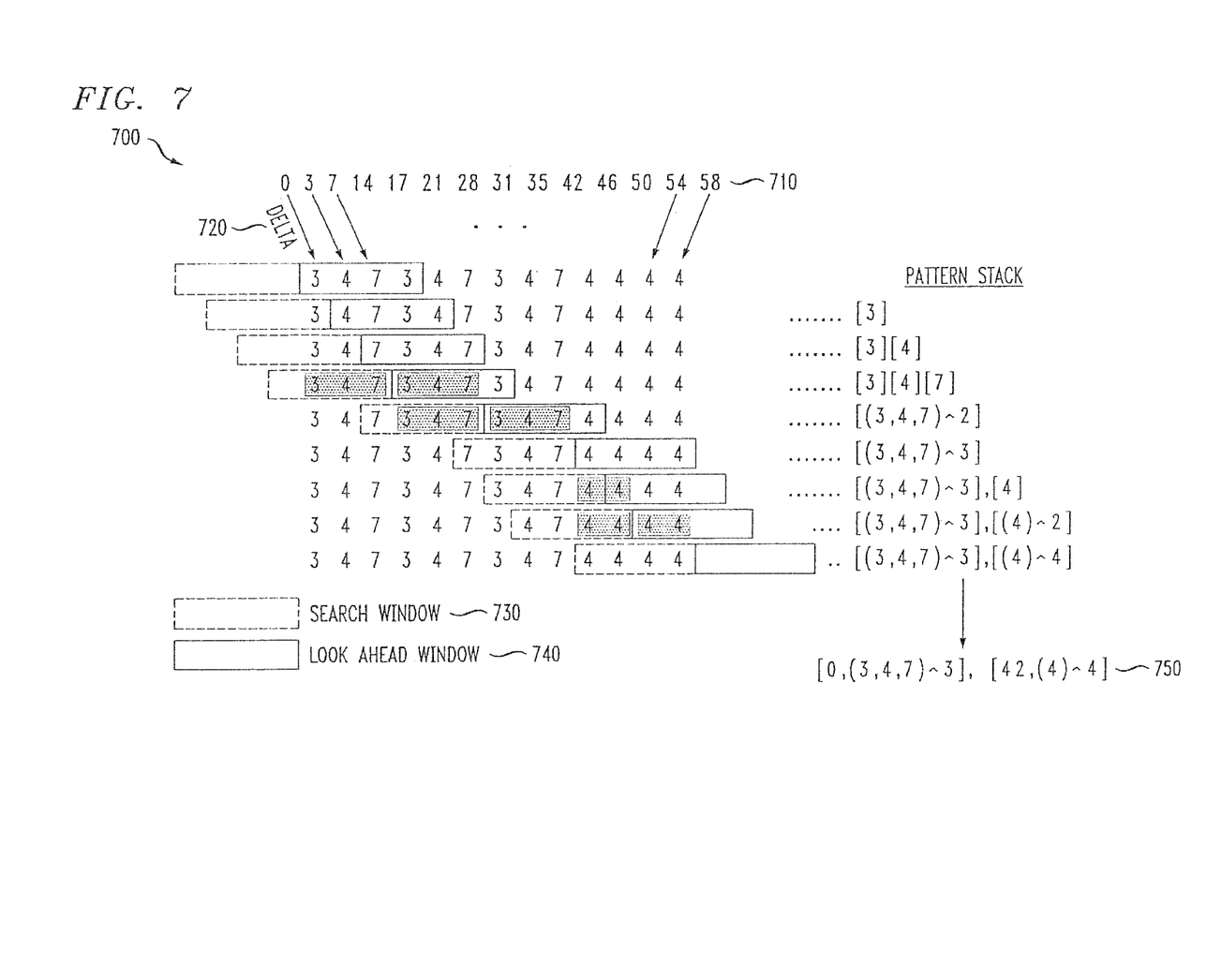
FIG. 7 provides an example for discovering patterns in an exemplary sequence of logical offsets to demonstrate the algorithm of FIG. 6.

FIG. 7 provides an example 700 for discovering patterns in an exemplary sequence of logical offsets 710 (0, 3, 7, 14, 17, 21, 28, . . . ) to demonstrate the algorithm of FIG. 6. As shown in FIG. 7, the logical offsets 710 are preprocessed to deltas 720. Two windows 730, 740 move along the deltas to find repeating subsequences. To represent a pattern of a sequence of numbers in a compact way, the pattern unit structure discussed above is employed. The eventual pattern output 750 shown in FIG. 7 is [0, (3, 4, 7)^3], [42, (4)^4].

Suppose w is the window size in the algorithm of FIG. 6 and example of FIG. 7, the time complexity of finding repeating parts between the search window 730 and lookahead window 740 is $O(w)$, since it is essentially a string searching problem and can be solved using the KMP algorithm (D. Knuth et al., "Fast Pattern Matching in Strings," SIAM Journal on Computing, 6(2):323-350 (1977)) or other similar algorithms. According to the while loop of the algorithm of FIG. 6, two windows move forward by at least one position in an iteration. The overall time complexity of this pattern recognition algorithm is $O(wn)$. n is the length of the input sequence.

To compress PLFS mappings, given a sequence of tuples (i.e., raw index entries) (logical offset, length, physical offset), the tuples are separated into three arrays by their types: logical_offset[ ], length[ ], physical_offset[ ]. First, patterns in the logical_offset[ ] array are found using a pattern detection engine based on the algorithm of FIG. 6. Then, elements in the length[ ] array are grouped according to patterns found in the logical_offset[ ] array, and their patterns are discovered separately by group. Later, the physical_offset[ ] array is processed in the same way.

Figure 8:
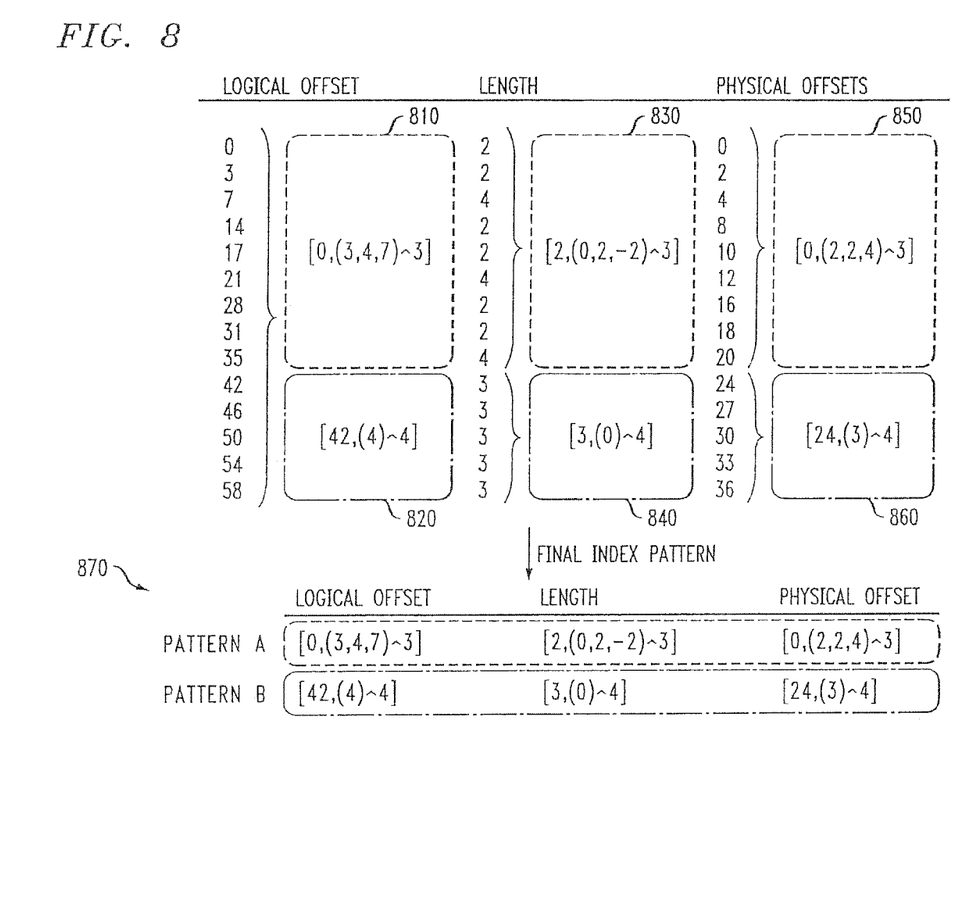
FIG. 8 is an example illustrating the PLFS mapping compression procedure mapping from logical positions to physical positions.

FIG. 8 is an example illustrating the PLFS mapping compression procedure mapping from logical positions to physical positions. As shown in FIG. 8, two patterns 810, 820 are found in the logical_offset[ ] array. The length[ ] array is separated into two groups 830, 840, and the corresponding raw lengths of the two patterns are fed into the pattern recognition engine and length patterns are found within each group. Also, elements in the physical_offset[ ] array are processed in a similar manner as the lengths and grouped into groups 850, 860 and patterns are detected. Finally, patterns 870 for the same raw entries are grouped together.

Figure 9:
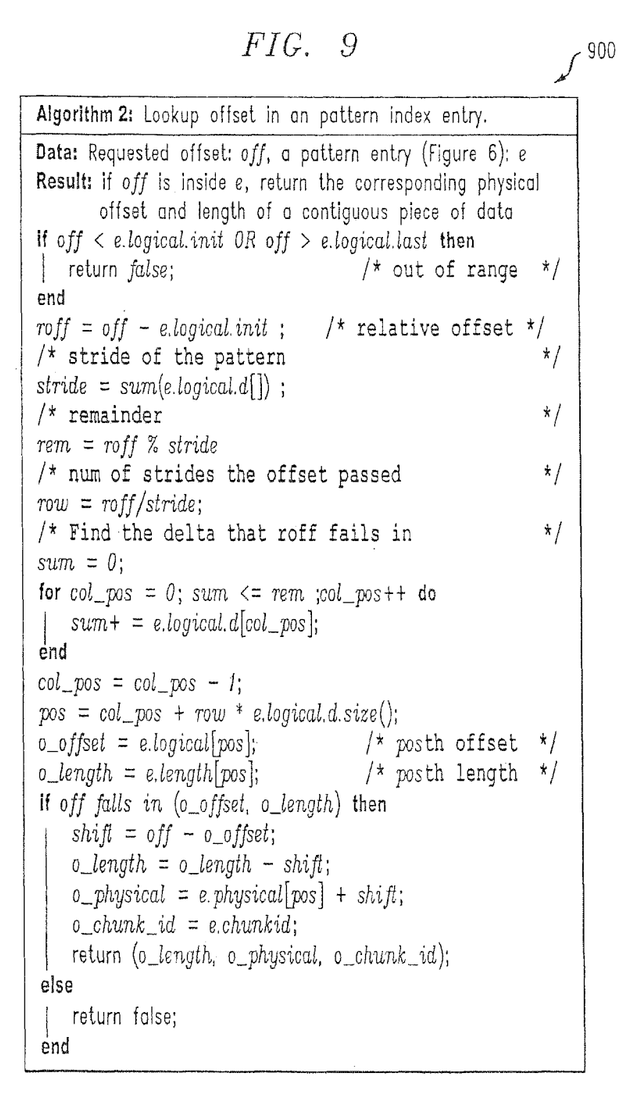
FIG. 9 illustrates an exemplary implementation of a lookup algorithm for looking up an offset in an pattern index entry.

Since data has been reorganized, when I/O read requests come to PLFS, PLFS needs to look up the requested offsets in associated indices to decide the corresponding physical offsets. An exemplary implementation of the lookup algorithm 900 is described in FIG. 9 for looking up an offset in an pattern index entry. Generally, the lookup algorithm 900 finds the position of the biggest logical offset that is not larger than the request offset, off, in the logical offset pattern, finds the corresponding length, len, by the position, checks if off falls in (off,len) and returns the corresponding physical offset. For example, consider a request of read(off=29, len=1) assuming the patterns of FIG. 8. Since 0<29<42, the request can only fall within the pattern starting with 0 (Pattern A). Then:

$$row=(29-0)/(3+4+7)=2$$

$$rem=(29-0)\bmod(3+4+7)=1$$

Since $0 < rem \leq 3$, rem falls in the first delta in Pattern A's logical offsets ([0, (3, 4, 7)^3]). Thus, the position that off=29 falls into is pos=2×3+1=7 (3 is the number of deltas in the pattern). Use pos to find out the logical offset (29), length (2) and physical offset (16). Then, check if the requested data is within the segment and decide the physical offset.

Suppose n is the total number of index entries, the time complexity of traditional PLFS lookup is O(log n) if binary search is used. The time complexity of the lookup in FIG. 9 is O(e.logical.d.size( )), since it has to calculate stride and go through e.logical.d[ ] to find pos. Fortunately, e.logical.d.size( ) is typically not a large value and the constant factor in O(e.logical.d.size( )) is small (2). If m is the number of total entries, the time complexity of looking up an offset in all indices is O(log m*delta.size( )) when the entries have already been sorted by their initial offsets. The worst case scenario is that the request offset is in a hole and PLFS has to check every pattern index entry to find out. Fortunately, if patterns are present, m is very small. To simplify lookup, special cases such as overlaps and negative strides could be avoided by sorting and merging entries.

Global Pattern Structure

Figure 10:
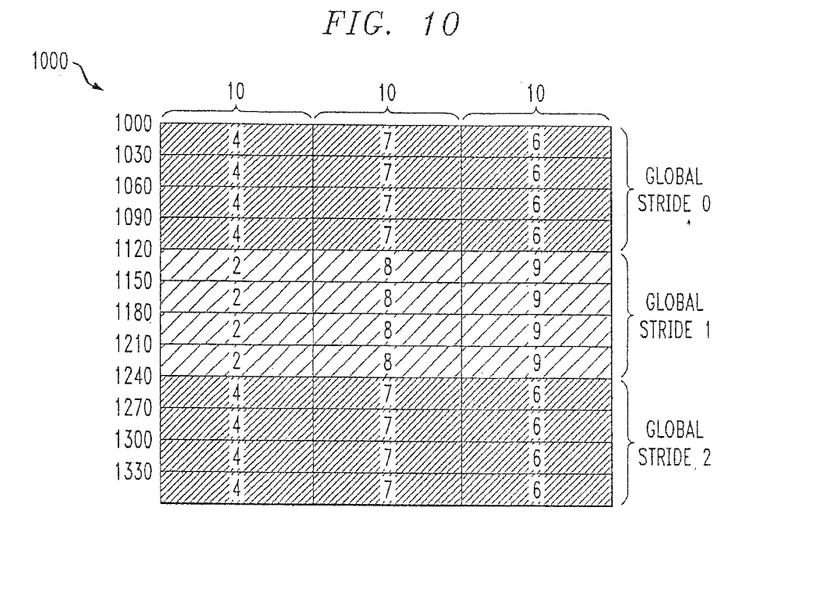
FIG. 10 is an example of a global pattern.

A global pattern is constructed using local pattern structures. To merge local patterns into global patterns, Pattern PLFS first sorts all local patterns by their initial logical offsets. Then every pattern is processed to check if neighbor patterns abut one another. FIG. 10 is an example of a global pattern. Initially, a group of three processes (PID: 4,7,6) write with a local strided pattern (the size of data shared by the same group of processes is a global stride), referred to as global stride 0. After that, processes (2,8,9) writes with a local strided pattern, referred to as global stride 1. Then, processes (4,7,6) repeats the pattern, referred to as global stride 2. A global pattern is essentially consecutive repeating local patterns. Since local patterns are repeating, only one local pattern is stored in a global pattern structure 1100 (FIG. 11) and the difference between the structure for global and local patterns is that a global pattern structure 1100 maintains a list of chunk IDs instead of only one chunk identifier.

Figure 11:
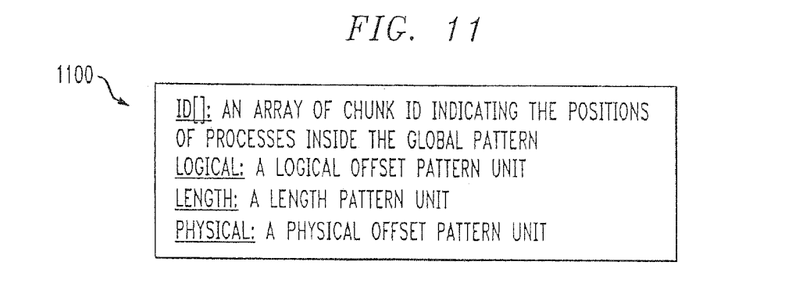
FIG. 11 illustrates the storage of a local pattern using a global pattern structure that maintains a list of chunk identifiers'
Figure 12:
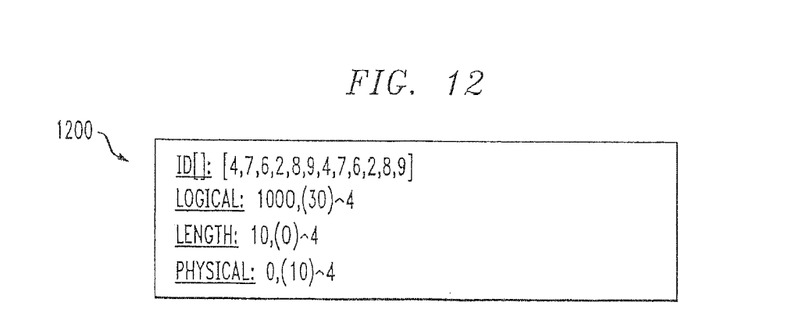
FIG. 12 illustrates a global pattern structure for the example of FIG. 10.

Assuming each local pattern repeats twice and the physical offset starts at 0, the global pattern structure in FIG. 10 can be described by the exemplary global pattern structure 1100 of FIG. 11. For many MPI applications, rank numbers are related to data processing and its data layout, so identifiers can be further compressed by patterns, if necessary. FIG. 12 illustrates the global pattern structure 1200 for the example of FIG. 10.

Figure 13:
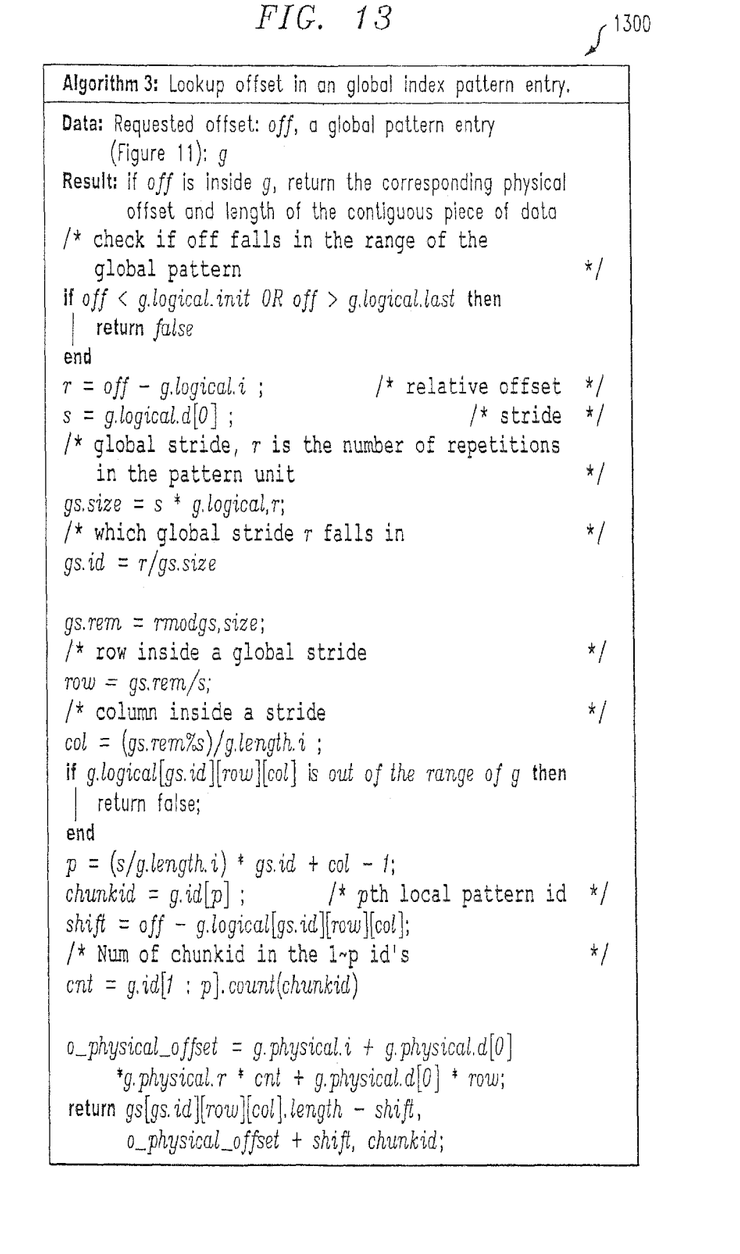
FIG. 13 illustrates pseudo code for an exemplary process for looking up an offset in a global pattern structure.

FIG. 13 illustrates pseudo code for an exemplary process 1300 for looking up an offset in a global pattern structure 1100. Generally, the row and column in the imaginary global pattern matrix corresponding to the requested offset is identified. To find the physical offset within a data dropping file, Pattern PLFS needs to figure out how much data has been written to the file before the piece of data requested. For example, the global stride (gs.size) of FIG. 10 is 120. Stride (s) is 30. If the request off is 1250, r is 250. Global stride id (gs.id) is 250/120=2, which indicates off falls in the Global Stride 2. Global stride remainder (gs.rem) is 10, row=10/30=0, col=(10 mod 30)/10=1. The logical offset of the data is 1000+120*2+30*0+10=1250; length=10. Because:

$$s/length*gs.id+col=(30/10)*2+1=7,$$

so the chunk id is g.id[7]=7. Physical offset is $$0+10*4*1+10*0=40.$$

A time consuming part of the algorithm 1300 in FIG. 13 occurs while processing the statement cntg.id[1:p].count (chunkid), where Pattern PLFS has to go from the first identifier to the p th identifier and find out how many chunkids there are in g.id[1:p]. Fortunately, this can be calculated once with time complexity O(n) (where n is the number of local patterns) and cached in the pattern structure (this can be even faster if g.id[ ] can be described by patterns). So, the later lookups do not need to calculate the number of chunkids again and the time complexity becomes O(1). The time complexity of looking up an offset in p global pattern entries in memory is O(log p), since the algorithm 1300 has to locate an entry in p entries.

Pattern-Aware Prefetching

Typical applications involve both I/O and computation, reading data from file systems into memory and then manipulating that data. For example, scientific applications need to read data generated by simulations for subsequent analysis, or read checkpoints to resume after interruptions. Visualization applications need to read large amounts of saved data structures, process them, and render them visually for analysis in a timely manner. In these cases, large read latency can result in intolerable delays. Prefetching is an effective way of reducing the I/O latency by predicting future data that will be used by the application and makes it available in memory before it is requested by the application. The process of prefetching can overlap computation with I/O so that the I/O latency, while unchanged, does not affect the users' experience.

The accuracy of prediction is important for prefetching. Inaccurate predictions will introduce overhead without any corresponding benefit. Accurate predictions which are not made quickly enough also do not provide benefit. Even more challenging is that prefetching the right data too early can also degrade performance since the data occupies memory and prevents it from being used for other purposes. Even though it is challenging, prefetching with read-ahead is implemented in almost all storage systems and has been shown to provide large benefits for applications which do sequential reading. Unfortunately, many applications, especially scientific ones, present I/O patterns that do not appear sequential at the storage system.

For example, many applications read data with patterns of varying strides due to the fact that they read from different segments of their files where each segment contains data of different types. These patterns are regular, but not sequential, so conventional readahead prefetch algorithms do not provide benefit. However, the pattern detection algorithm provided by aspects of the present invention can discover the patterns and predict their future I/O requests.

System Overview

Figure 14:
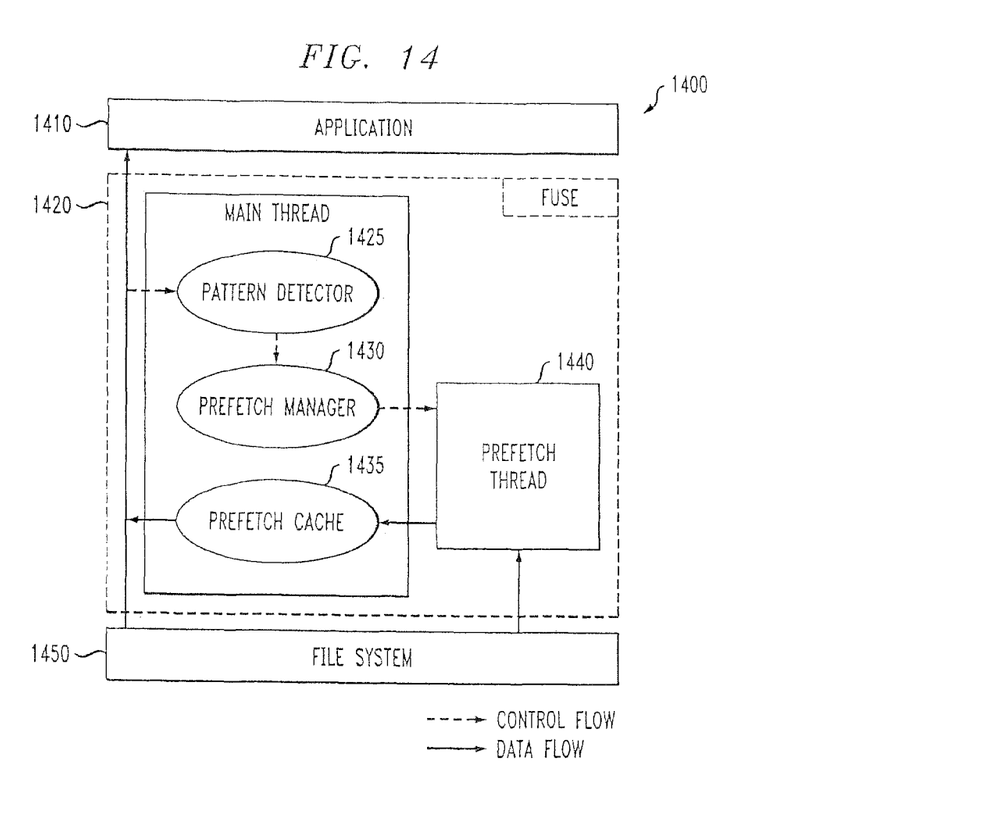
FIG. 14 is a block diagram of an exemplary pattern-aware prefetching file system incorporating aspects of the present invention.

FIG. 14 is a block diagram of an exemplary pattern-aware prefetching file system 1400 incorporating aspects of the present invention. The exemplary pattern-aware prefetching file system 1400 is implemented as a FUSE file system to intercept, inspect, and forward I/O requests to another file system. The exemplary pattern-aware prefetching file system 1400 allows prefetching for non-sequential, but regular, I/O patterns. The requests are observed, patterns are detected, and any detected patterns are used to prefetch data for predicted future reads.

As shown in FIG. 14, the exemplary pattern-aware prefetching file system 1400 provides a layer 1420 between applications 1410 and a standard underlying file system 1450. For write workloads, the layer 1420 forwards all writes to the underlying file system 1450. For read workloads, however, the layer 1420 will attempt pattern-aware prefetching; reads which were correctly predicted and prefetched will be satisfied from the cache of the layer 1420 but reads which were not predicted will necessarily be forwarded to the underlying file system 1450.

As shown in FIG. 14, the layer 1420 is comprised of a pattern detector 1425, a prefetch manager 1430, a prefetch cache 1435. The pattern detector 1425 records read requests and detects their patterns. The exemplary pattern detector 1425 is modularized so that any pattern detection algorithm can be plugged in. The prefetch manager 1430 receives pattern information from the pattern detector 1425 and predicts future requests based on these patterns. The exemplary prefetch manager 1430 sends requests for predicted future requests to a prefetch thread 1440, which is in charge of fetching data from file systems into the prefetch cache 1435. When read requests are received from the application, the exemplary pattern-aware FUSE file system 1400 will check the prefetch cache 1435. If the data is not in the cache 1435, the exemplary pattern-aware FUSE file system 1400 will issue I/O calls to the underlying file system 1450 and wait for the data. Otherwise, the exemplary pattern-aware FUSE file system 1400 will return data to the application 1410 from the prefetch cache 1435 immediately without again fetching data from the file system 1450. Since moving data within memory is much faster than moving from disk to memory, I/O latency is reduced.

Pattern Detection and Prediction

To discover patterns for prefetching, the pattern detector 1425 periodically tries to find patterns from the recent request history using the algorithm of FIG. 6 and example of FIG. 7. Then, the prefetch is conducted using prediction based on the current pattern. For example, if the current offset pattern detected is [0,(3, 4, 7)^2] (using the pattern unit notation discussed above), the prefetch manager 1430 can predict future requests that may follow it. In this example, the next three request offsets predicted should be 31, 35, 42, as explained below.

$$0+(3+4+7)\times 2+3=31$$

$$0+(3+4+7)\times 2+3+4=35$$

$$0+(3+4+7)\times 2+3+4+7=42$$

Figure 15:
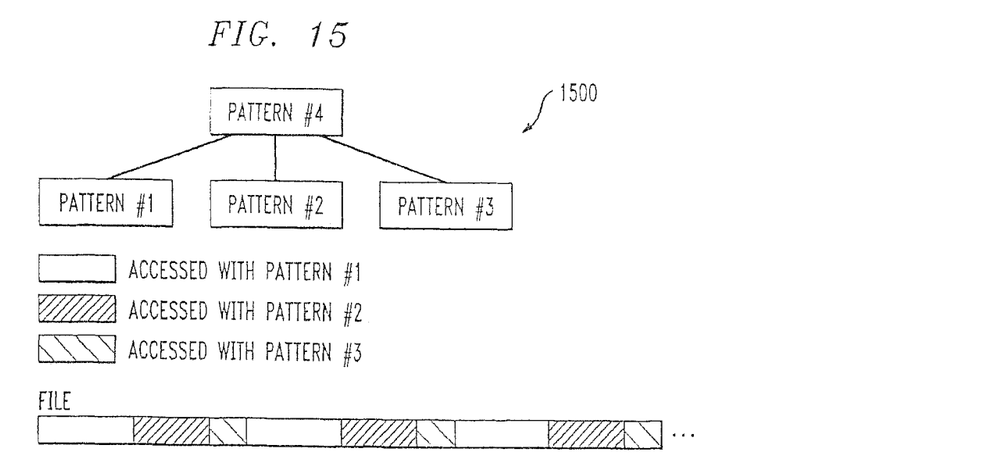
FIG. 15 illustrates a multi-level pattern tree for storing advanced predictions as nodes of a tree structure.

For more advanced predictions, the patterns can be organized as nodes of a tree structure as shown by an example in FIG. 15, where Pattern numbers 1, 2 and 3 repeat as a whole and they form the larger pattern 4. This multi-level pattern tree can be built by using the algorithm of FIG. 6 multiple times. For the first time, the input is a sequence of numbers. Starting from the second time, the input is the sequence of patterns found from the previous time. In the tree structure, child patterns are represented as pattern units (using the pattern unit notation discussed above) without i. The parent pattern has a full pattern unit describing the pattern of i of its children. I/O libraries using multi-level data layout or I/O operations in complex embedded loops may produce recursive patterns. The tree structured pattern is suitable for these cases.

For an additional discussion of pattern detection, see, for example, U.S. patent application Ser. No. 13/921,719 (now U.S. Pat. No. 9,811,545), filed Jun. 19, 2013, entitled "Storage of Sparse Files Using Parallel Log-Structured File System," and/or Jun He et al., "I/O Acceleration with Pattern Detection," HPDC'13, Jun. 17-21, 2013, New York, N.Y., USA, each incorporated by reference herein.

Exemplary Use Cases

Discovering patterns within unstructured I/O and representing them compactly and losslessly are promising techniques and can be applied in other systems. One such example is pre-allocation of blocks in file systems. This eager technique, similar to prefetching, uses predictions of future accesses to optimistically perform expensive operations ahead of time. The disclosed pattern detection of complex access patterns can improve these predictive abilities. In another example, SciHadoop, the ratio of metadata (keys, which are dimensional information) to data can be very high, thereby incurring tremendous latency when it is transferred. See, e.g., J. Buck et al., "SIDR: Efficient Structure-Aware Intelligent Data Routing in SciHaDoop," Technical Report, UCSC. The disclosed technique can be applied to shrink the size of these keys and eventually reduce overhead by using these discovered structures to represent keys. Finally, as HPC continues to grow to extreme scales, tracing I/O is increasingly challenging due to the size of the traces. Lossy techniques such as sampling are one way to reduce the size of the traces; the disclosed patterns could do so without loss and make it feasible to understand I/O behaviors at very large scale with fine granularity.

Among other benefits, the disclosed pattern-aware prefetching techniques reduce the metadata that must be stored and improved the I/O latency. Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

One or more of the devices in this implementation include a processor or another hardware device coupled to a memory and a network interface. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, the methods in accordance with the present invention can be implemented at least in part in the form of one or more software programs that are stored in the device memory and executed by the corresponding processor. The memory is also used for storing information used to perform computations or other operations associated with the invention.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for accessing at least a portion of a shared file, comprising:
    performing the following steps, in response to at least one read request for at least a first portion of said shared file:
    detecting at least one pattern in at least two consecutive non-sequential accesses of said shared file, wherein said at least one pattern is detected by analyzing distances between consecutive logical offsets in said at least one read request for said shared file; and
    prefetching at least a second portion of said shared file from at least one storage device, wherein said second portion is predicted to be accessed based at least in part on said detected at least one pattern,
    wherein said shared file is created by a plurality of processes, wherein each of said plurality of processes has a unique physical logfile for storing data written by a corresponding process and a unique physical index file for storing metadata for the corresponding process, wherein, for a given write operation of a data chunk to the shared file by a given one of said plurality of processes, (i) said data chunk is stored in said unique physical logfile corresponding to said given process, and (ii) an index entry is created for said unique physical index file corresponding to said given process, that maps said data chunk within a logical representation of said shared file to a location within said unique physical logfile, wherein a plurality of said index entries is stored in said unique physical index file corresponding to said given process in a compressed format using said detected at least one pattern and wherein said prefetching of said at least second portion of said shared file is performed using at least one of said unique physical index files, comprising said compressed format, for said plurality of processes and wherein the method is performed by at least one processing device comprising a processor coupled to a memory.

2. The method of claim 1, wherein said prefetching step comprises a pre-allocation of said at least said second portion of said shared file.

3. The method of claim 1, further comprising the step of storing said at least said second portion of said shared file in a prefetch cache.

4. The method of claim 3, further comprising the step of providing said at least said second portion of said shared file from said prefetch cache to an application requesting said at least said second portion of said shared file.

5. The method of claim 4, wherein a prefetch manager receives said detected at least one pattern from a pattern detector, predicts future requests based at least in part on said detected at least one pattern and requests a prefetch thread to fetch said at least said second portion of said shared file from a file system for storage in said prefetch cache.

6. The method of claim 4, further comprising the step of determining whether said prefetch cache stores said second portion of said shared file requested in a read request.

7. The method of claim 1, wherein said detecting step further comprises the steps of obtaining a plurality of read requests and detecting one or more patterns in said obtained plurality of read requests.

8. The method of claim 1, wherein said unique physical index file indicates how said unique physical logfile for storing data written by the corresponding process was written and how said unique physical logfile for storing data written by the corresponding process is read.

9. A non-transitory processor-readable storage medium having stored therein program code of one or more software programs, wherein the program code when executed by at least one processing device causes the at least one processing device to perform the following steps in response to at least one read request for at least a first portion of a shared file:
    detecting, using at least one processing device of a pattern-aware prefetching file system, at least one pattern in at least two consecutive non-sequential accesses of said shared file, wherein said at least one pattern is detected by analyzing distances between consecutive logical offsets in said at least one read request for said shared file; and
    prefetching at least a second portion of said shared file from at least one storage device, wherein said second portion is predicted to be accessed based at least in part on said detected at least one pattern,
    wherein said shared file is created by a plurality of processes, wherein each of said plurality of processes has a unique physical logfile for storing data written by a corresponding process and a unique physical index file for storing metadata for the corresponding process, wherein, for a given write operation of a data chunk to the shared file by a given one of said plurality of processes, (i) said data chunk is stored in said unique physical logfile corresponding to said given process, and (ii) an index entry is created for said unique physical index file corresponding to said given process, that maps said data chunk within a logical representation of said shared file to a location within said unique physical logfile, wherein a plurality of said index entries is stored in said unique physical index file corresponding to said given process in a compressed format using said detected at least one pattern and wherein said prefetching of said at least second portion of said shared file is performed using at least one of said unique physical index files, comprising said compressed format, for said plurality of processes.

10. The non-transitory processor-readable storage medium of claim 9, wherein said prefetch manager pre-allocates said at least said second portion of said shared file.

11. The non-transitory processor-readable storage medium of claim 9, wherein said detecting step further comprises the steps of obtaining a plurality of read requests and detecting one or more patterns in said obtained plurality of read requests.

12. The non-transitory processor-readable storage medium of claim 9, wherein said unique physical index file indicates how said unique physical logfile for storing data written by the corresponding process was written and how said unique physical logfile for storing data written by the corresponding process is read.

13. A pattern-aware prefetching file system, comprising:
a pattern detector of a pattern-aware prefetching file system for detecting, in response to at least one read request for at least a first portion of a shared file, using at least one processing device of said pattern-aware prefetching file system, at least one pattern in at least two consecutive non-sequential accesses of said shared file, wherein said at least one pattern is detected by analyzing distances between consecutive logical offsets in said at least one read request for said shared file; and
a prefetch manager for prefetching, in response to said at least one read request for said at least first portion of said shared file, at least a second portion of said shared file from at least one storage device, wherein said second portion is predicted to be accessed based at least in part on said detected at least one pattern; and
a prefetch cache for storing at least said portion of said shared file,
wherein said shared file is created by a plurality of processes, wherein each of said plurality of processes has a unique physical logfile for storing data written by a corresponding process and a unique physical index file for storing metadata for the corresponding process, wherein, for a given write operation of a data chunk to the shared file by a given one of said plurality of processes, (i) said data chunk is stored in said unique physical logfile corresponding to said given process, and (ii) an index entry is created for said unique physical index file corresponding to said given process, that maps said data chunk within a logical representation of said shared file to a location within said unique physical logfile, wherein a plurality of said index entries is stored in said unique physical index file corresponding to said given process in a compressed format using said detected at least one pattern and wherein said prefetching of said at least second portion of said shared file is performed using at least one of said unique physical index files, comprising said compressed format, for said plurality of processes.

14. The pattern-aware prefetching file system of claim 13, wherein said prefetch manager pre-allocates said at least said second portion of said shared file.

15. The pattern-aware prefetching file system of claim 13, wherein at least said second portion of said shared file from said prefetch cache are provided to an application requesting said at least said second portion of said shared file.

16. The pattern-aware prefetching file system of claim 15, wherein said prefetch manager receives said detected at least one pattern from said pattern detector, predicts future requests based at least in part on said detected at least one pattern and requests a prefetch thread to fetch said at least said second portion of said shared file from another file system for storage in said prefetch cache.

17. The pattern-aware prefetching file system of claim 15, wherein said prefetch manager determines whether said prefetch cache stores said second portion of said shared file requested in a read request.

18. The pattern-aware prefetching file system of claim 13, wherein said pattern detector is further configured to obtain a plurality of read requests and detect one or more patterns in said obtained plurality of read requests.

19. The pattern-aware prefetching file system of claim 13, wherein said a pattern detector is further configured to obtain a plurality of read requests.

20. The pattern-aware prefetching file system of claim 13, wherein said unique physical index file indicates how said unique physical logfile for storing data written by the corresponding process was written and how said unique physical logfile for storing data written by the corresponding process is read.

* * * * *

UNITED STATES PATENT AND TRADEMARK OFFICE
CERTIFICATE OF CORRECTION

PATENT NO. : 11,080,196 B2  
APPLICATION NO. : 16/716972  
DATED : August 3, 2021  
INVENTOR(S) : John M. Bent et al.

Page 1 of 1

It is certified that error appears in the above-identified patent and that said Letters Patent is hereby corrected as shown below:

On the Title Page

Item (57), Lines 11-12, In the Abstract, replace "to an application requesting the at least a portion of the one or more files" with -- to an application requesting at least the portion of the one or more files --

In the Claims

In Column 14, Line 37, in Claim 19, insert at the end -- and detect one or more patterns in said obtained plurality of read requests --

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*